United States Patent

[11] 3,573,581

| [72] | Inventors | John J. Dutko<br>North Plainfield;<br>Richard Beck, Morris Plains; Henry A.<br>Seesselberg, South Plainfield, N.J. |
|---|---|---|
| [21] | Appl. No. | 836,103 |
| [22] | Filed | June 24, 1969 |
| [45] | Patented | Apr. 6, 1971 |
| [73] | Assignee | The Singer Company<br>New York, N.Y. |

[54] SYSTEM FOR CONTROLLING NEEDLE
POSITIONING DRIVE AND THREAD TRIMMING
FUNCTIONS OF AN INDUSTRIAL SEWING
MACHINE DRIVEN BY A CONTINUOUSLY
COUPLED DC MOTOR
10 Claims, 9 Drawing Figs.

[52] U.S. Cl. .................................................. 318/266,
112/219, 318/466
[51] Int. Cl. ..................................................... H02p 3/06
[50] Field of Search ........................................... 112/219;
318/265, 266, 466

[56] References Cited
UNITED STATES PATENTS

| 3,328,658 | 6/1967 | Thompson............... | 318/138 |
| 3,268,047 | 8/1966 | Grygera, et al. ............. | 112/219 |
| 3,374,410 | 3/1968 | Cronquist, et al. ........... | 318/138 |
| 3,435,314 | 5/1969 | Bradley ........................ | 318/138 |
| 3,443,181 | 6/1969 | Tozol, et al. .................. | 318/138 |
| 3,466,517 | 9/1969 | Leenhouts..................... | 318/138 |

Primary Examiner—Oris L. Rader
Assistant Examiner—K. L. Crosson
Attorneys—Marshall J. Breen and Chester A. William, Jr.

ABSTRACT: Solid-state digital logic circuitry with gates, memory flip-flops, delay and sensor elements provide a logic system for controlling the drive and braking currents to a DC motor continuously coupled in driving relation to a sewing machine. In response to certain input commands, a series of events are signaled by the logic circuitry to occur automatically in a predetermined time sequence resulting in a desired output sewing related function. Silicon controlled rectifiers (SCR's) are used to supply driving current to the motor from a polyphase voltage supply. A single SCR is used to supply dynamic braking current for the motor. The single SCR is turned off to terminate a first braking period when a solid-state switch operates responsively to a speed sensor to reduce the SCR current below its holding value.

Patented April 6, 1971

INVENTORS
John J. Dutko
Richard Beck
Henry A. Seesselberg

BY Marshall J. Breen
ATTORNEY

INVENTORS
John J. Dutko
Richard Beck
Henry A. Seesselberg

Patented April 6, 1971 3,573,581

INVENTORS
John J. Dutko
Richard Beck
Henry A. Seesselberg

WITNESS:

BY
ATTORNEY

INVENTORS
John J. Dutko
Richard Beck
Henry A. Seesselberg

BY *Marshall J. Breen*
ATTORNEY

SYSTEM FOR CONTROLLING NEEDLE POSITIONING DRIVE AND THREAD TRIMMING FUNCTIONS OF AN INDUSTRIAL SEWING MACHINE DRIVEN BY A CONTINUOUSLY COUPLED DC MOTOR

BACKGROUND OF THE INVENTION

Industrial sewing machines are conventionally driven by clutch-brake induction motors having inertia flywheels for storing and releasing the kinetic energy to supply accelerating torque to the sewing machines. When needle positioning is required, a fixed low speed drive is supplied from an auxiliary motor or from a speed-reducer clutched to the main motor. The mechanical movement associated with the clutching and braking of these prior art systems is a constant source of difficulty related to inertia delay and wear of the parts. In accordance with the invention shown and described in the copending Ser. No. 787,797 filed Dec. 30, 1968 and assigned to the same assignee as that of the present application, a sewing machine is continuously and directly coupled to a low-inertia DC motor and all starting, running and stopping of the sewing machine is controlled by controlling the flow of current into and out of the armature of the motor by the gating of silicon controlled rectifiers (SCR's) and there is no mechanical clutching and braking anywhere in the system. In order to extend the advantages of the direct-coupled drive to the functions of automatic needle positioning and automatic thread trimming, it is necessary to supply a sequencing control which forces certain events to proceed in a logical order responsively to single input commands and it is the purpose of this invention to provide such a control.

SUMMARY OF THE INVENTION

In keeping with the solid-state nature of the direct coupled drive system, all logic decisions in the system of the present invention are performed by solid-state digital components which removes at once all possible difficulties associated with mechanical inertia and wear. The logic circuitry employs conventional solid-state logic components such as phototransistor sensors, flip-flops, NAND gates, inverters, and discrete switching transistors in a circuit which responds to the single input commands of (1) needle-down position, (2) needle-up position, and (3) thread trim operation.

NEEDLE-DOWN POSITION

The needle-down positioning cycle involves the accurate stopping of the drive motor in a minimum time from top speed driving condition and requires both speed sensing and needle-down position sensing. The speed sensing is required to establish a predetermined speed at which it is practical to search for the proper stop position. The position sensing is required to determine the final stop position accurately.

One logical approach to the positioning problem would be to brake the motor at once to a random stop and then accelerate to a low positioning speed and search for the proper stop position. This has the disadvantage of requiring too much time. The present system is based on different logic which avoids a random stop and brakes the motor in two discrete sequential stops. The first braking period is terminated when the motor reaches a speed slightly above 400 r.p.m. This requires a speed sensor which, in the present invention, may be a phototransistor which optically generates a pulse train of frequency related to the motor speed. A programmable unijunction transistor, serving as a timing device, is connected to the speed sensor and is set to emit a control pulse when the decelerating motor reaches a speed slightly above 400 r.p.m. This control pulse triggers a brake release device which forces the brake SCR to turn off and leaves the motor in a decelerating condition approaching 400 r.p.m. This control pulse also triggers a first monostable multivibrator which, when it later reverts to its stable state, enables the drive SCR's to turn on and furnish positive torque drive at 400 r.p.m. The first multivibrator, when triggered to quasistable state also triggers a second monostable multivibrator which inhibits a needle-down signal sensor for the definite time it is in its quasistable state to permit the drive SCR's to stabilize the driving speed at 400 r.p.m. before search is begun.

At the time when the second multivibrator reverts to its stable state, the needle-down signal sensor is enabled and emits a pulse which initiates a brake command and the motor is dynamically braked to standstill with the needle down.

NEEDLE-UP POSITION

With the sewing machine at rest in a treadle relaxed needle-down position, the operator may actuate a switch which initiates a command to drive to needle-up position. This switch applies a trigger pulse to a needle-up flip-flop having complementary outputs. One output goes low and triggers the drive control flip-flop to command the drive SCR's to turn on. Simultaneously, the other output goes high and triggers a switching transistor to prepare the drive trigger line for a soft start. This other output also enables a gate to couple any needle-up pulses emitted by a needle-up position sensor to the direct set line of the drive control flip-flop so that when a needle-up pulse is emitted, the drive control flip-flop resets and its output disables the drive SCR's and commands the brake SCR to turn on (after and RC delay) and the sewing machine comes to rest in a needle-up position.

THREAD TRIM OPERATION

This operation requires a specific time sequence of energization of three solenoids (picker, trimmer, and wiper) coordinated with a specific sequence of needle positions.

With the sewing machine at rest in a needle-down position, a normally closed switch is opened by heeling the treadle and initiates a trimming command by emitting a pulse which is passed by a gate, enabled by a needle-down position sensor signal, to trigger a flip-flop having complementary outputs. One output goes low and triggers a monostable multivibrator which energizes a picker solenoid for the guasistable period. When this multivibrator returns to its stable state, it emits a trigger pulse which triggers the needle-up flip-flop and commands the sewing machine to drive to needle-up position in the same manner as described above for the needle-up command. The high output of the needle-up flip-flop enables a gate which passes the needle-up position sensor signal to trigger a monostable multivibrator which energizes a trimmer solenoid for the quasistable period and after an RC delay also energizes a wiper solenoid for the remainder of the period. When the multivibrator returns to its stable state it resets the needle-up flip-flop to its original state. T;.e sewing machine is now at rest in the needle-up position with the bobbin and needle thread trimmed and wiped.

It is an object of this invention to provide a solid state digital control system for automatically sto7ping a sewing machine with respect to a predetermined desired needle position without the use of any electromechanical relays or clutch brake devices.

It is a further object of this invention to provide a solid state digital control system for automatically coordinating the sequential energization and deenergization of three solenoids with respect to needle positions as required for automatic thread trimming in a sewing machine.

It is a still further object of this invention to provide a solid state digital control system for generating a train of logic signals for controlling the gating of controlled rectifiers supplying driving and braking currents to a DC motor continuously drivingly coupled to a sewing machine for automatically performing desired sewing functions responsively to certain simple input commands.

DESCRIPTION OF THE INVENTION

Other objects and advantages of this invention will become apparent from the following description when taken in connection with the accompanying drawings wherein.

Figure 1:
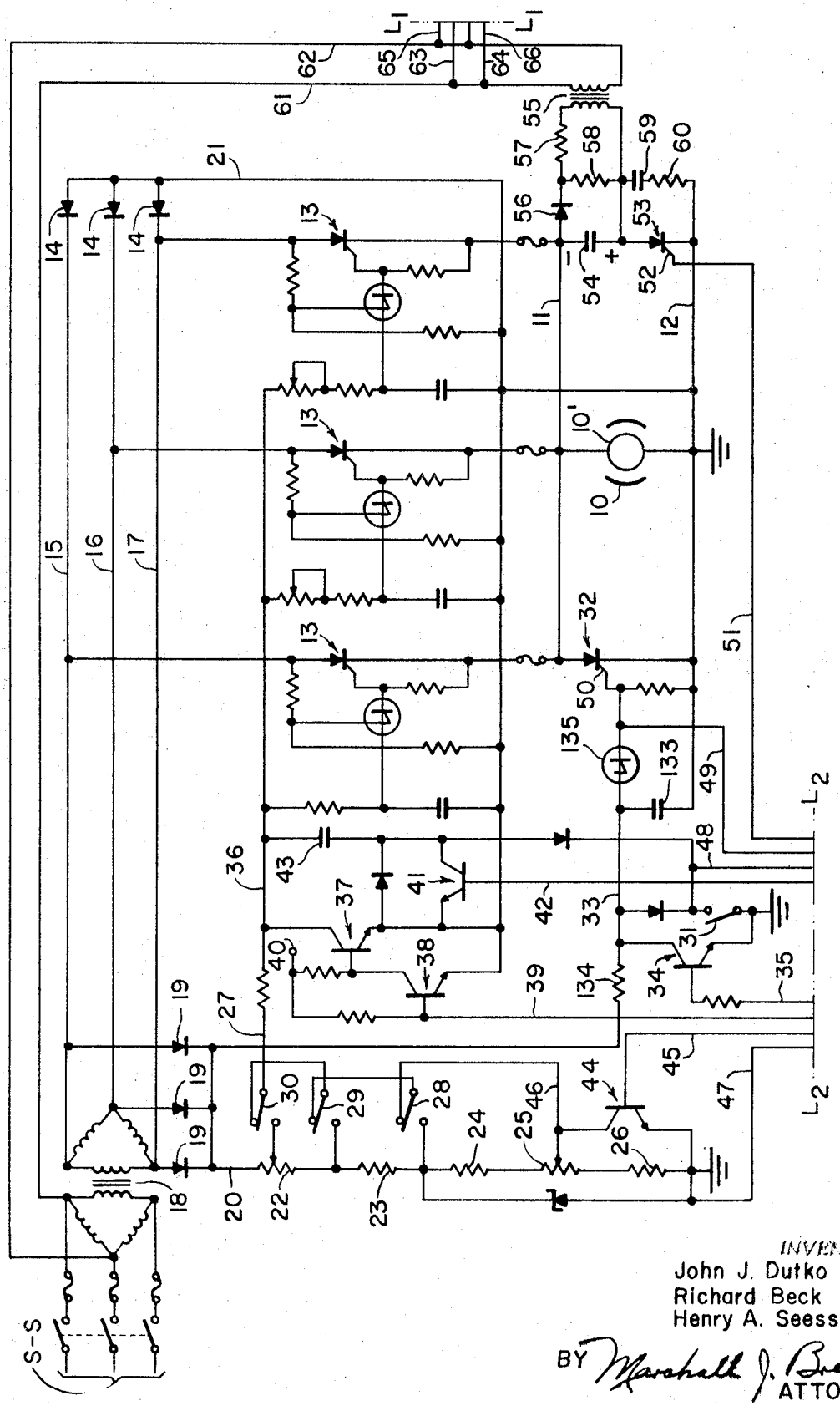
FIG. 1 is a schematic circuit diagram of part of the control system embodying the present invention.

Referring more particularly to FIG. 1 a circuit is shown which is essentially in part the same as the circuit shown and described in the copending Ser. No. 787,797 filed Dec. 30, 1968 and assigned to the same assignee as that of the present application. The system as set forth in the application noted above provides for starting, running and random stopping of a sewing machine by operator-manipulation of a treadle. The system of the present invention adds to the prior system the capabilities of automatic stopping in a selected needle position and of thread trimming. The circuit will be briefly described where similar to the prior circuit and will be described in detail with respect to additional circuitry which enables the additional capabilities.

A DC motor 10 has an armature 10' supplied on lines 11 and 12 with direct current controlled by the variable and sequential triggering of controlled rectifiers (SCR's) 13 which combine with fixed rectifiers 14 to form a polyphase AC-DC bridge fed from polyphase AC voltage on lines 15, 16 and 17 obtained from a regular commercial source S-S of polyphase AC voltage through a stepdown transformer 18.

Fixed rectifiers 19 combined with rectifiers 14 form a polyphase AC-DC bridge supplying a constant reference DC voltage on lines 20 and 21. Line 21 is connected to system ground. A voltage divider formed by series-connected resistors 22, 23, 24, 25 and 26 provide a voltage on line 27 which may be increasingly adjusted by operating switches 28, 29 and 30 sequentially by an operator-actuated treadle (not shown). The position of these switches shown in FIG. 1 corresponds to a relaxed position of the treadle and it will be understood that depression of the treadle actuates the switches 28, 29 and 30, in that order, to apply increasing positive voltage to line 27 in discrete steps to provide discrete increased speeds for the motor 10. The switch 31 is also actuated by the treadle and is open as shown in FIG. 1 in relaxed position, but closes and remains closed for all depressed positions of the treadle.

A brake SCR 32 provides, when conducting, a low resistance path in shunt with the motor armature 10' for dynamic braking. A trigger line 33 for the brake SCR 32 may be grounded through a switching transistor 34 controlled by a signal on line 35. A drive trigger line 36 may be grounded through a switching transistor 37 which is controlled by a transistor 38 which in turn is controlled by a signal on line 39. Base bias for transistors 37 and 38 is obtained from a suitable positive voltage applied to terminal 40.

A switching transistor 41 controlled by a signal on line 42 provides means for enabling capacitor 43 to effect a controlled rise time on trigger line 36 when a soft start is desired.

A transistor 44 is controlled by a signal on line 45 and, when turned on, grounds line 46 to disable the triggering of the drive SCR's 13 in the relaxed position of the treadle with switches 28, 29 and 30 in the position shown. Line 47 connects to ground and line 48 connected to ground through switch 31. Line 49 connects to the gate 50 of the brake SCR 32 and therefore conducts the same pulse which turns on SCR 32.

Line 51 connects to the gate 52 of a brake-release SCR 53 for supplying a triggering signal thereto. A capacitor 54 is charged to the DC polarity shown from a low AC voltage furnished by transformer 55 through a rectifier circuit comprising diode 56 and resistors 57 and 58. A conventional damping circuit consisting of capacitor 59 in series with resistor 60 is connected across the anode-cathode terminals of SCR 53. The transformer 55 is supplied on lines 61 and 62 with AC voltage from one phase of the supply source S-S. Lines 63 and 64, 65 and 66 are connected to lines 61 and 62 as shown. For convenience in following the circuit, these lines in FIG. 1 terminate in a cutline $L_1$–$L_1$ which may be matched to a cutline $L_1$–$L_1$ in FIG. 3 for continuation of the circuit thereto. Similarly, the lines 35, 39, 42, 45, 47, 48, 49 and 51 of FIG. 1 terminate in a cutline $L_2$–$L_2$ which may be matched to cutline $L_2$–$L_2$ of FIG. 2 for continuation of the circuit thereto.

Figure 2:
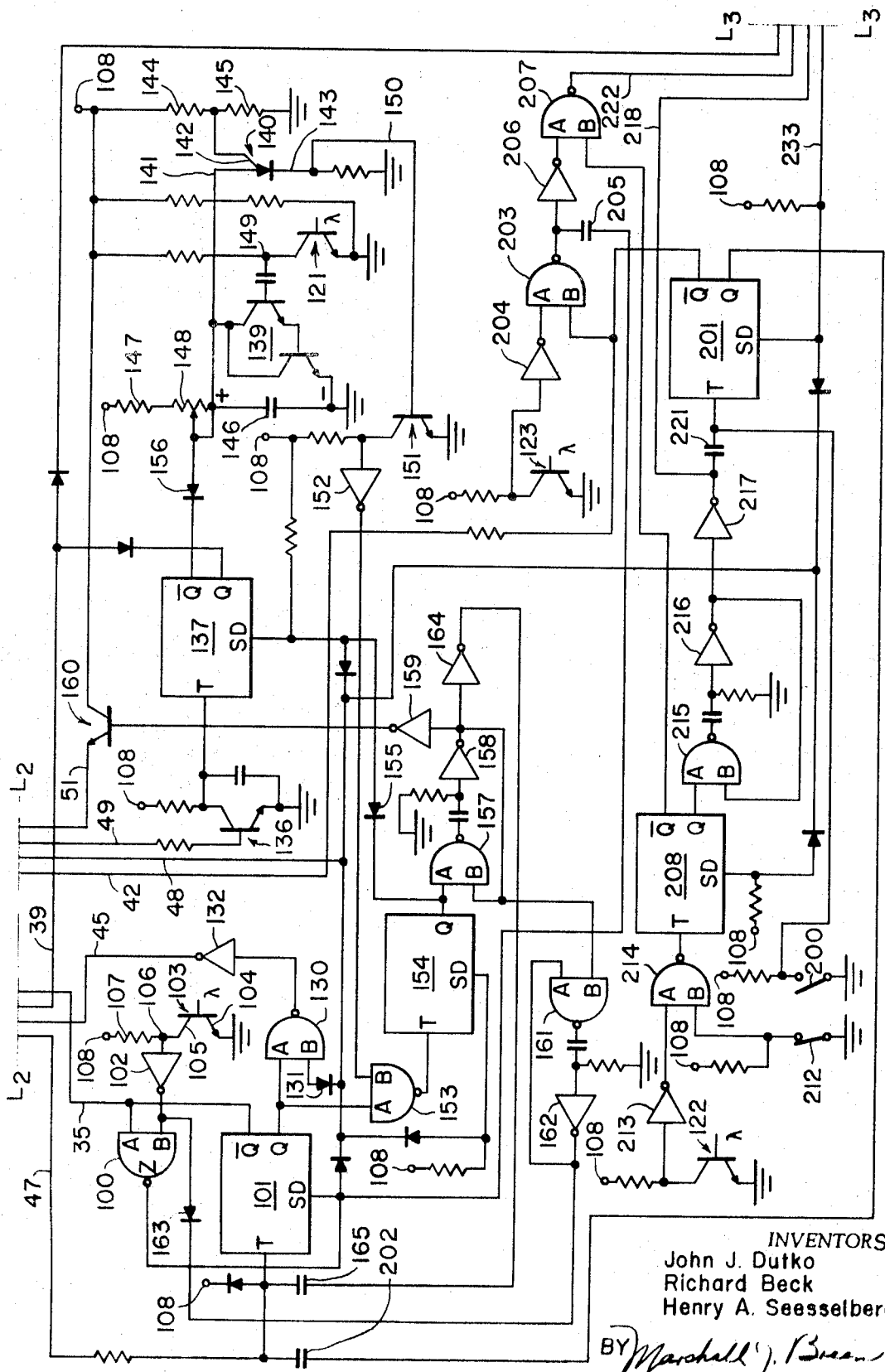
FIG. 2 is a continuation of the circuit diagram shown in FIG. 1.

Referring now to FIG. 2 which contains the majority of the solid-state logic components used in this system, it will be seen that, basically, only three kinds of logic components are used, each represented by a different but consistent symbol. For example, 100 represents a NAND gate having two inputs A and B, and a single output Z. 101 represents a flip-flop having a trigger input T, a direct set input SD, and two complementary outputs Q and $\bar{Q}$. 102 represents an inverting amplifier having a single input and output.

The logic signal in this system has two values designated as high and low. The high value is substantially +5 v. and the low value is substantially zero or ground level.

The NAND gate is a logic component in which the value of the output signal is conditioned by the values of the input signals and it obeys the following logic: If either or both of the input signals A, B is low, the output signal Z is high and if both of the input signals are high, the output signal is low.

The flip-flop is a memory logic component and, in the form used in this system, obeys the following logic: The flip-flop has only two stable states. In its first state the output Q is high and the output $\bar{Q}$ is low. In its second state the output Q is low and the output $\bar{Q}$ is high. A negative step input a T will change the flip-flop from the first to the second state unless it is already in the second state. A positive step input at T will have no effect on the flip-flop. A negative step input at the direct set input SD will change the flip-flop to its first state unless it is already in that state. A positive step input at the direct set input SD will have no effect on the flip-flop.

The inverting amplifier merely inverts the output signal with respect to the input. That is to say, a high input signal produces a low output signal and a low input signal produces a high output signal.

It will be understood that these logic components are per se conventional integrated-circuit components and are commercially obtainable but their arrangement in the circuit configuration of this invention produces noval and useful results.

Also shown in the circuit of FIG. 2 are phototransistors which function to generate waveforms related in time to the angular speed of the armshaft of the sewing machine or to a specific angular position of the armshaft and thus related to needle position as will be explained. These are conventional phototransistors well known in the art and are normally non-conducting but may be switched to a conducting state by light energy applied to the base-emitter junction. A typical phototransistor is shown schematically as 103 in FIG. 2. The emitter 104 is grounded and the collector 105 is connected to output terminal 106 and through a resistor 107 to terminal 108 which is connected to the positive terminal of the logic power supply which in this case, is +5 v. For low levels of illumination, the phototransistor is cutoff and the output voltage at terminal 106 is essentially +5 v. When the illumination level reaches a high value, the phototransistor turns on and the signal at terminal 106 falls to zero or ground level. Thus the output signal at terminal 106 is essentially a rectangular waveform in time varying between the levels of +5 v. and 0 v. responsively to the illumination received by the phototransistor. This operation and circuitry is typical of all the sensors used in this system.

Figure 4:
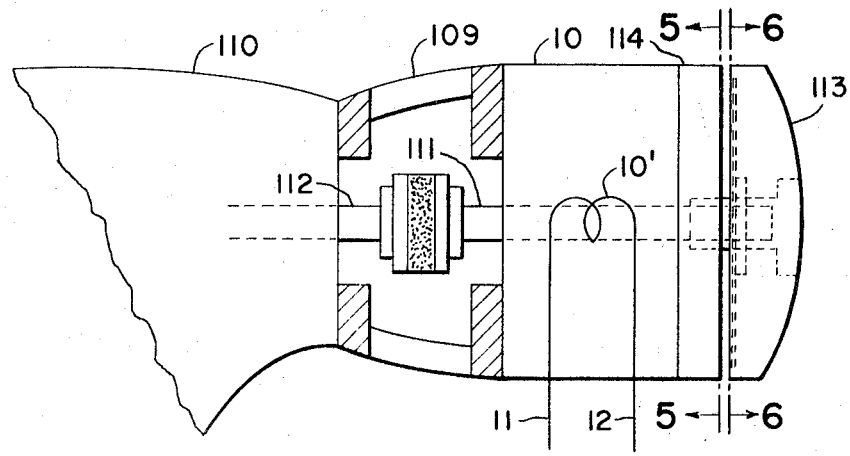
FIG. 4 is a fragmentary elevational view showing the relation between the driving motor, the sewing machine and the speed and position sensors used in the system of this invention.
Figure 5:
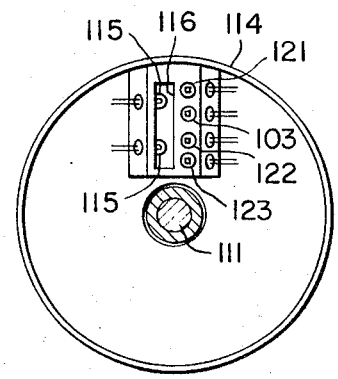
FIG. 5 is a view taken on line 5–5 of FIG. 4.
Figure 6:
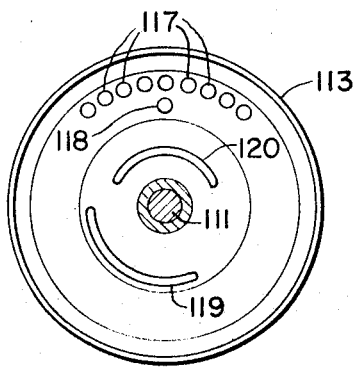
FIG. 6 is a view taken on line 6–6 of FIG. 4.

Referring for the moment to FIGS. 4, 5 and 6, there is shown, somewhat schematically, the sensor arrangement for generating the speed and position signals used in the present system. The motor 10 containing the rotating armature 10' is mounted on a bracket 109 connected to the sewing machine frame 110. A motor shaft 111 carrying the armature 10' is drivingly coupled at one end to the armshaft 112 of the sewing machine and at the other end to a handwheel 113. A bracket 114 secured to the motor 10 supports two miniature incandescent lamps 115 which project into a cavity in the bracket which forms an illuminated slit 116 positioned radially of the axis of shaft 111.

On the inner face of the handwheel 113 adjacent to the bracket 114 is mounted a reflecting pattern seen best in FIG. 6. Near the periphery is a ring of equally spaced reflecting dots 117 for producing a speed signal. Next a single reflecting dot 118 is positioned at a smaller radius, a reflecting segment 119 is located at a still smaller radius and finally a reflecting segment 120 is positioned on the smallest radius from the axis of shaft 111.

Located in equally spaced alignment on a substantially radial line adjacent to the slit 116 are phototransistors 121, 103, 122 and 123 which are radially positioned to match respectively with the reflecting dots 117, 118 and the segments 119 and 120. It will be apparent from the above that the light from the slit 116 is reflected by the respective dot or segment onto the appropriate phototransistor to generate a time-related waveform indicative of the rotational speed or position of the shaft 111. The single dot 118 is for producing a needle-down positioning pulse to signal to phototransistor 103 that the motor is driving at stable positioning speed so that the kinetic energy is low enough for dynamic braking to bring the motor to rest within an acceptable needle-down position which position may be later monitored by the position of the segment 119 with respect to the phototransistor 122. The segment 120 with respect to the phototransistor 123 provides a signal indicating that a proper needle-up position has been obtained. Close axial spacing of the bracket 114 relative to the handwheel 113 prevents ambient light from adversely affecting the system.

Figure 3:
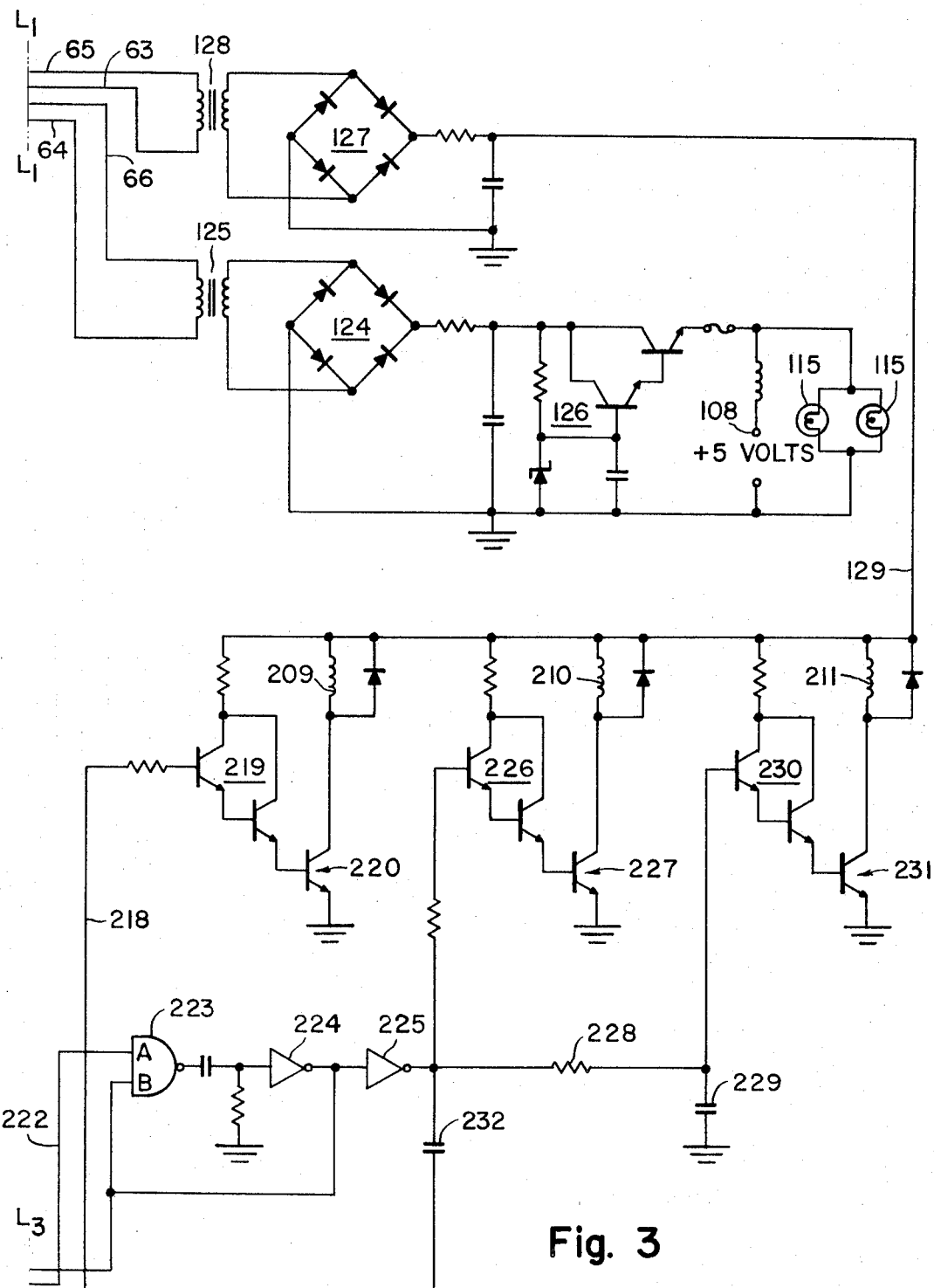
FIG. 3 is a continuation of the circuit diagram shown in FIGS. 1 and 2.

Referring now briefly to FIG. 3, a bridge rectifier 124 fed from a stepdown transformer 125 fed by lines 64, 66 supplies at terminal 108 a positive DC voltage of 5 v. which is closely regulated by a conventional voltage regulator 126. This is the power supply for the low power logic system and wherever the terminal 108 is found in the drawings, it will be understood that this indicates a connection to this source of +5 v. regulated DC. This same power supply also furnishes constant current to the incandescent lamps 115 shown and described in FIG. 5. A bridge rectifier 127 fed from a stepdown transformer 128 fed from lines 63, 65 supplies line 129 with +24 v. DC which furnishes power for actuating solenoids later to be described.

Having generally described above the type and function of the individual logic components and the sensors and inasmuch as the circuit connections are clearly evident, the operation of the logic system as a whole will now be described, particularly with respect to FIGS. 1, 2 and 3.

OPERATION

LOGIC CONTROL OF DRIVE CIRCUITRY FOR NEEDLE-DOWN POSITIONING

When the treadle is in the relaxed position, as shown by the switch positions in FIG. 1, the drive control circuitry is controlled by transistor 44. When transistor 44 is saturated, the voltage on line 46 is essentially zero and the drive SCR's 13 cannot be triggered into conduction. When transistor 44 is turned off, a low positive voltage appears on line 46 which triggers the drive SCR's at a low firing angle and drives the motor 10 at a low positioning speed which may be preset by adjusting the tap on resistor 25.

The logic state of transistor 44 is controlled by the NAND gate 130. During a normal sewing sequence with the treadle depressed, switch 31 is closed and input B of gate 130 is coupled through diode 131 to ground by way of line 48. Thus a low input at B of gate 130 results, by NAND operation, in a high output therefrom which is inverted by inverter 132 which applies a low signal to the base of transistor 44 by way of line 45 and turns off 44 which turns on the drive circuitry as described above. The operator may then control the sewing speed in the normal manner by controlling the closure of switches 28, 29 and 30 responsively to the amount of depression of the treadle.

If now the operator wishes to command a stop with needle-down position, the treadle is relaxed and switches 28, 29, 30 and 31 are in the condition shown in FIG. 1. The opening of switch 31 permits input B of gate 130 to go high. Flip-flop 101 is in its set or first state with output Q high. Thus, both inputs to gate 130 are high resulting in a low output which is inverted by inverter 132 which applies a high signal on the base of transistor 44 causing it to saturate and turn off the drive circuitry.

DYNAMIC BRAKING

At the same instant that switch 31 opens and the drive is inhibited, capacitor 133 (FIG. 1) is allowed to charge through resistor 134 to the triggering potential of silicon unilateral switch 135 which emits a trigger pulse to the brake SCR 32. The RC delay of 134 and 133 enables the drive SCR's 13 to clear and turn off before the brake SCR 32 turns on. The brake SCR 32, when conducting, provides a low resistance path shunting the armature 10'. The motor acts as a generator working into a heavy load which results in a rapid deceleration of the motor by dynamic braking.

The same positive trigger pulse which turns on the brake SCR 32 is also coupled by way of line 49 to the base of transistor 136 turning it on and providing a negative going pulse to the T input of flip-flop 137. The Q output of 137 goes low which, through line 39, couples the base of transistor 38 to ground and turns it off. The high collector of 38 is directly coupled to the base of transistor 37 which therefore saturates and couples the drive trigger line 36 to ground. Thus when the brake SCR 32 is on, the drive SCR's 13 cannot be enabled even though commanded to do so by treadle command.

SPEED SENSING

When flip-flop 137 is triggered from the brake pulse, $\bar{Q}$ output goes high and activates a speed sensor circuit. The speed sensor circuit consists of a phototransistor 121, a Darlington amplifier 139 and a programmable unijunction transistor 140. The transistor 140 is a well-known device obtainable commercially from General Electric and designated as PUT-D13T1. This is a three-terminal planar-passivated PNPN device having an anode 141, an anode gate 142 and a cathode 143. The known characteristics of this device are that a blocking state exists as long as the positive anode voltage is below the positive gate voltage. However, when the anode voltage goes slightly above the gate voltage the device is triggered into conduction and the anode-cathode path assumes a very low forward impedance. In the circuit shown here, the gate voltage on 142 is determined by the voltage divider formed by resistors 144 and 145. The anode voltage on 141 is determined by the positive voltage appearing on the timing capacitor 146 when it is permitted to charge towards +5 v. at terminal 108 through resistors 147 and 148.

As seen in FIGS. 4, 5 and 6, the phototransistor 121 receives the light reflected periodically by the reflective dots 117 as the handwheel 113 rotates at the motor speed. In the present arrangement there are 72 dots (117) equally spaced around the periphery. Therefore, the phototransistor 121 emits (at terminal 149) 72 pulses per revolution of the handwheel. These pulses are amplified in the Darlington amplifier 139. The period of these pulses is a function of the rotational speed of the motor and at a speed of 400 r.p.m., the period is approximately 2 milliseconds. It will be seen that, during the positive portion of the pulse train at terminal 149, the Darlington amplifier 139 effectively shorts the capacitor 146 periodically so that it is only permitted to charge during the negative portions of this pulse train which are of a duration equal to half the pulse period or approximately 1 millisecond at 400 r.p.m. The time required to charge capacitor 146 to the trigger potential $V_c$ of the programmable unijunction transistor 140 is adjusted by a tap on resistor 148 to be slightly less than 1 millisecond. Thus, no pulses can be emitted from 140 until the motor has slowed down enough to permit a phototransistor pulse having a half period of at least 1 millisecond. This emitted pulse from 140 will indicate that the motor speed is approximately 400 r.p.m.

Figure 7:
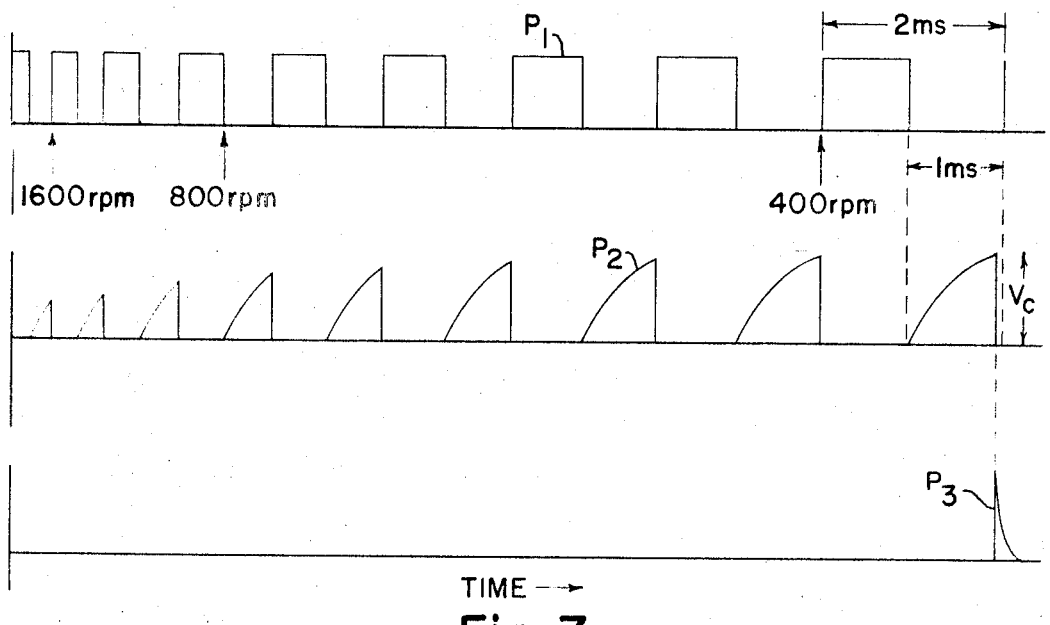
FIG. 7 is a graphical representation of the time-related waveforms used to explain the operation of the speed sensing circuit.

The above operation is shown graphically in FIG. 7 where $P_1$ is the output waveform of the phototransistor 121 at terminal 149. $P_2$ is the waveform of the periodic charging and discharging of capacitor 146 and $P_3$ is the pulse emitted by the programmable unijunction transistor 140 when the capacitor finally is charged to the trigger voltage $V_c$ of 140. All waveforms in FIG. 7 are referenced to the same time scale and represent a decelerating condition of the motor as indicated by the r.p.m. markers applied to the $P_1$ pulse train. Thus, when the motor has decelerated to approximately 400 r.p.m. a positive pulse $P_3$ is emitted on line 150.

BRAKE RELEASE CIRCUIT

The positive pulse $P_3$ is coupled through transistor 151 and inverter 152 to the B input of gate 153. Since the input A of gate 153 is coupled high by the Q output of flip-flop 101, the positive pulse on input B of gate 153 will produce a negative pulse at its output which is directly coupled to the T input of flip-flop 154. The Q output of flip-flop 154 goes low. The direct set input SD of flip-flop 137 is thus coupled through diode 155 to ground through the Q output of 154 and therefore flip-flop 137 returns to its set position which causes its $\overline{Q}$ output to go low and couple capacitor 146 to ground through diode 156. Since the capacitor 146 can no longer charge, the speed sensor circuit is deactivated.

When the Q output of flip-flop 154 went low, it also triggered the integrated circuit monostable multivibrator consisting of gate 157 and inverter 158. The output of 158 goes low for approximately 1 millisecond. This negative pulse is inverted by inverter 159 and the resulting positive pulse is coupled through transistor 160 by way of line 51 to the gate 52 of the brake-release SCR 53. Capacitor 54 has been previously charged to about 5 v. with the polarity shown as described above. Thus, when the brake-release SCR 53 turns on, capacitor 54 supplies current to the brake loop which is in opposition to the existing brake current. This reduces the current through the brake SCR to zero and turns it off. The discharge time constant of the capacitor 54 is about 20 microseconds. After this time, the energy in capacitor 54 is dissipated and current in the brake-release SCR 53 goes to zero and turns it off. At this period in time the motor is coasting at a speed preferably slightly above 400 r.p.m. as established by the speed sensor.

While a controlled rectifier 53 has been shown as the switching device for connecting the capacitor 54 into the brake loop for turning off the brake SCR 32 by opposing the brake current, it will be understood that a power transistor may, if desired, be substituted for the brake-release SCR 53.

Figure 9:
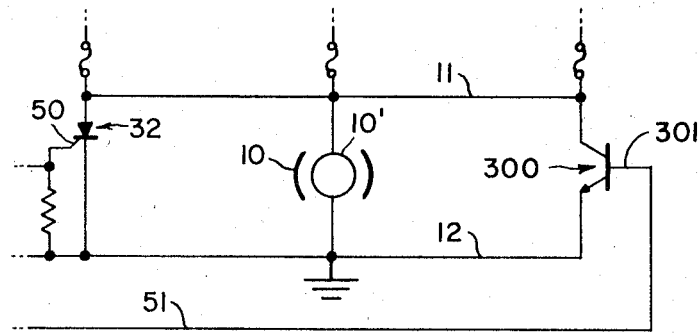
FIG. 9 is a schematic circuit diagram showing a modification of a portion of the circuit of FIG. 1 wherein a transistor is used in place of a controlled rectifier to effect turn off of the brake SCR.

A further alternative arrangement is shown in FIG. 9 which does not require the use of the capacitor 54 to effect a turn off of the brake SCR 32. As seen in FIG. 9, a normally nonconducting power transistor 300 has its collector-emitter path connected directly across the motor armature 10'. The base 301 of the transistor 300 is connected to line 51 to receive the positive brake release trigger pulse which drives the transistor 300 into saturation. The resistance of the collector-emitter path of the transistor 300, when saturated, can be made very small so that it will literally "starve" the brake SCR 32 of current and turns it off. If the transistor 300 remains saturated long enough by the trigger pulse on line 51 to permit the SCR 32 to return to its blocking state, the SCR 32 will remain off even when the transistor 300 is turned off at the end of the trigger pulse. It will be noted that the modified circuit of FIG. 9 eliminates the need for components 53, 54, 55, 56, 57, 58, 59 and 60 in FIG. 1.

POSITIONING NEEDLE-DOWN

When the monostable multivibrator consisting of gate 157 and inverter 158 switches to its quasistable state, the negative pulse at the output 158 activates the monostable multivibrator consisting of gate 161 and inverter 162. The output of 162 goes low for approximately 11 milliseconds. This low signal is coupled through diode 163 to the B input of gate 100 and inhibits gate 100 from responding to a needle-down sensor pulse supplied by phototransistor 103 for the 11 milliseconds period of the monostable multivibrator.

The output of the monostable multivibrator 157, 158 is inverted by inverter 164 and, when the multivibrator returns to its stable state, the negative going signal at the output of inverter 164 is coupled through capacitor 165 to the trigger input T of flip-flop 101. The Q output of 101 now goes low. This low signal is coupled through gate 130 and inverter 132 and turns off transistor 44 (FIG. 1). This permits positive voltage to rise on line 46 and to energize the drive trigger line 36. Since switch 31 is open, capacitor 43 is out of the circuit and the drive trigger line 36 rises immediately to the trigger potential adjusted by the tap on resistor 25 to provide a drive positioning motor speed of 400 r.p.m. Since the motor was coasting at slightly above 400 r.p.m. when the drive is turned on, the back E.M.F. of the armature 10' is already present and a soft start is not required to allow the back E.M.F. to build up. This quickly establishes a driving torque and allows the motor speed to stabilize at driving positioning speed in the shortest possible time, thus preventing the speed from undershooting.

When flip-flop 101 was triggered, the $\overline{Q}$ output goes high. This high is coupled to the A input of gate 100. Now any needle-down sensor pulses emitted by the phototransistor 103 responsively to light reflected from reflecting dot 118, will be coupled through gate 100. The high $\overline{Q}$ output of 101 is also coupled to the base of transistor 34 which saturates and shorts capacitor 133 to ground. Therefore no brake SCR gate trigger pulses can be emitted by the silicon unilateral switch 135 during the positioning drive sequence.

When 103 emits a needle-down sensor pulse, this pulse is coupled through inverter 102 and gate 100 to the direct set input SD of flip-flop 101 and sets the flip-flop to its original or first state.

The Q output of 101 now goes high and transistor 44 saturates and turns off the drive circuitry. The $\overline{Q}$ output of 101 goes low and locks out the further effect of needle-down sensor pulses through gate 100 and turns off transistor 34 through line 35. Capacitor 133 is thus allowed to charge to the firing potential of 135 and a brake pulse is emitted to trigger the brake SCR 32. Dynamic braking takes place again, but this time the braking is applied until the motor comes to a stop.

Figure 8:
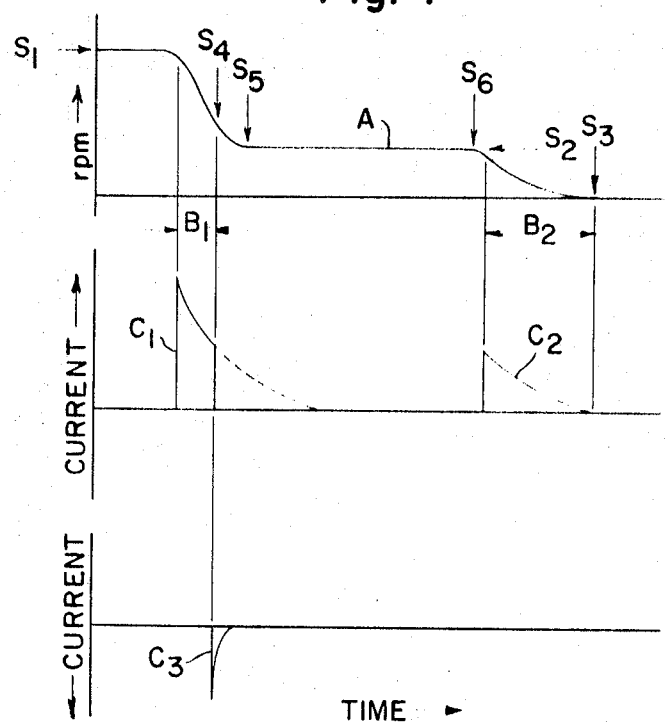
FIG. 8 is a graphical representation of the time-related waveforms used to explain the operation of the sequential braking circuit.

The above-described operation is shown graphically in FIG. 8 wherein curve A is a plot of the motor speed versus time and shows the transitions from top running speed at $S_1$ through a first braking period $B_1$ to a positioning drive speed $S_2$ (400 r.p.m.) and through a second braking period $B_2$ to standstill at $S_3$. $C_1$ is a waveform of the current through the brake SCR 32 during the first braking period $B_1$. $C_2$ is a waveform of the current through the brake SCR 32 during the second braking period $B_2$.

$C_3$ is the waveform of the negative current pulse applied by the brake-release SCR 53 to turn off the brake SCR 32 at a speed approaching 400 r.p.m. as signaled by the speed sensor circuit.

It will be noted on the curve A that, at $S_4$, the first braking period is terminated with the motor coasting at a speed approaching 400 r.p.m. At $S_5$ the positioning drive torque is established and, at $S_6$, the final position stop is signaled by the needle-down sensor pulse from 103.

LOGIC CONTROL OF DRIVE CIRCUITRY FOR NEEDLE-UP POSITIONING

The operator during a new sequence has commanded a needle-down position by relaxing the treadle. Now the sewing machine is at rest in a needle-down position, Should the operator require that the needle be up without a trim function, normally open switch 200 is closed. This applies a negative step voltage to the input T of flip-flop 201. The Q output of 201 goes low and capacitor 202 couples a negative pulse to the T input of flip-flop 101, the drive control flip-flop, and a drive command is given. The same series of events now occur as described above with respect to the establishment of the positioning drive torque at $S_5$ except that a soft start is signaled by the following operation. The $\bar{Q}$ output of 201 goes high and is coupled through line 42 to the base of transistor 41 which switches capacitor 43 into circuit again for a controlled soft start.

The high $\bar{Q}$ output of 201 is also coupled to the B input of gate 203. This enables the gate 203 to couple any needle-up position pulses emitted by the phototransistor 123 by light reflected from segment 120 (FIG. 6). The sewing machine now drives until the needle-up sensor emits a pulse which is coupled through inverter 204, gate 203 and capacitor 205 to the direct set input SD of the drive control flip-flop 101, which returns it to its original or first state and turns off the drive and applies dynamic braking until the sewing machine comes to rest as described above with respect of the final needle-down stop. The needle-up position pulse from gate 203 is also coupled through inverter 206 to the A input of gate 207. However, the B input of gate 207 is coupled to a low signal through the $\bar{Q}$ output of flip-flop 208 so that no change occurs at the output of gate 207. The sewing machine is now at rest with the needle in the up position.

LOGIC CONTROL OF DRIVE CIRCUITRY AND SOLENOIDS FOR THREAD TRIMMING FUNCTION

The thread trimming function is performed by a thread trimmer shown and described in the U.S. Pat. No. 3,400,677. It is sufficient for an understanding of the present invention to note that the thread trimming function involves the sequential energization of three solenoids shown in FIG. 3 coordinated with specific needle positions. The desired logic is well known and is as follows: A picker solenoid 209 is momentarily energized to move a thread catching finger towards the loop taker to seize both the needle and bobbin threads. Upon deenergization of the picker solenoid it retracts and draws the threads into a position to be subsequently severed by the trimmer. The above operation must take place with the needle in the down position. A trimmer solenoid 210 is next momentarily energized to sever the threads positioned by the picker solenoid. This operation must occur with the needle in its up position to prevent adverse interference between the trimmer knife and the needle. Finally, a wiper solenoid 211 is momentarily energized to wipe across the needle path to condition the needle thread for further sewing. This operation must occur subsequently to the thread severing operation and with the needle in the up position. How the foregoing required logic is performed by the system of this invention will now be described particularly with reference to FIGS. 2 and 3 wherein cutlines $L_3$–$L_3$ continuity.

When a needle-down command was given the sewing machine was driven to a needle-down rest position. The operator can now initiate a trim command by heeling the treadle which opens the normally closed trim switch 212. If the sewing machine is in a proper needle-down position for the trim sequence to occur, the output of the phototransistor 122 will be low and the inverter 213 will produce a high signal at input A of gate 214. When switch 212 is opened the input at B of 214 will go high and couple a negative step voltage to the trigger input T of flip-flop 208. The output Q of 208 goes low and triggers the monostable multivibrator consisting of gate 215 and inverter 216. The output of inverter 216 is coupled through inverter 217 and by way of line 218 to a conventional Darlington current-gain stage 219 and thence to transistor 220. Transistor 220 turns on and energizes the picker solenoid 209 from line 129 for the quasistable period of the multivibrator 215–216.

When the multivibrator 215–216 returns to its stable state, the output of inverter 217 goes low, the picker solenoid 209 is deenergized and a trigger pulse is coupled through capacitor 221 to the input T of flip-flop 201. The same drive sequence occurs now as during a needle-up command as before described with respect to closure of switch 200. Flip-flop 201 flips state and enables the gate 203 and the drive control flip-flop 101. The sewing machine drives to a needle-up position and comes to rest.

The $\bar{Q}$ output of flip-flop 208 which is coupled to the B input of gate 207 is now high and, when the needle-up segment 120 is sensed by the phototransistor 123, the output of gate 207 goes low and through line 222 triggers the monostable multivibrator consisting of gate 223 and inverter 224 (FIG. 3). The output of inverter 224 is coupled through inverter 225 and through a conventional Darlington current-gain stage 226 to a transistor 227. Transistor 227 turns on and energizes the trimmer (knife) solenoid 210 from line 129 for the quasistable period of the multivibrator 223-224.

The output of inverter 225 is also coupled through a 10 millisecond RC delay circuit consisting of resistor 228 and capacitor 229 to a conventional Darlington current-gain stage 230 which drives a transistor 231. The transistor 231 turns on and energizes the wiper solenoid 211 from line 129 for the remainder of the quasistable period of the multivibrator 223–224. This delay circuit is incorporated to allow the knife actuated by the trimmer solenoid 210 to trim the needle thread before it is wiped.

When the monostable multivibrator 223–224 returns to its stable state, the output of inverter 225 goes low and deenergizes the solenoids 210 and 211. A negative pulse is coupled through capacitor 232 and by way of line 233 to the direct set input SD of flip-flop 201 thus setting it to its original first state. The sewing machine is now at rest in the needle-up position with the bobbin and needle thread trimmed and the needle thread wiped. This sewing machine is now ready for further sewing commands.

From the above it will be apparent that, in accordance with this invention, there is provided a digital control system necessary to control the automatic driving and angular positional stopping of a sewing machine in selected needle positions responsively to selected input stop command signals including provision for an automatic thread trimming function responsively to a single selected input command.

The ability of this system to respond to simple input command signals makes automatic programmed sewing possible without the need for electromechanical or pneumatic controls with their inertia and wear difficulties.

While the invention has been described by means of a specific embodiment, it is not intended to be limited thereto, and obvious modifications will occur to those skilled in the art without departing from the spirit and scope of the invention.

We claim:

1. A digital control system for providing the switching logic necessary to control the automatic driving and angular positional stopping of a sewing machine in selected needle positions responsively to selected input command signals, comprising:

a DC motor coupled in continuous driving engagement with the sewing machine;

drive controlled rectifiers for applying driving current to said motor;

a brake controlled rectifier for applying braking current to said motor;

a solid-state control device for turning off said brake controlled rectifier;

solid-state pulse-generating means for generating waveform signals related in time to the angular speed and to the angular position of the motor; and solid-state gating means and memory means operative responsively to said selected input command signals and to said waveform signals to enable the triggering of said controlled rectifiers and said solid-state control device in proper time sequence to effect said driving and stopping of said sewing machine in the needle positions selected by said input command signals.

2. A digital control system for controlling the stopping of a sewing machine from top speed in a selected needle position responsively to a selected stop command signal, said sewing machine being continuously coupled to a single DC driving motor energizable from an AC voltage through drive controlled rectifiers, comprising; a brake controlled rectifier, a brake-release control device, means responsively to said stop command signal for disabling the drive controlled rectifiers and subsequently enabling the brake controlled rectifier to apply braking current to said motor, speed-responsive means and timing means coupled to said speed responsive means for emitting a pulse signal when the decreasing speed reaches a predetermined value, means responsively to said pulse signal for triggering said brake-release control device to turn off said brake controlled rectifier and leave the motor coasting at said predetermined speed, means responsively to said pulse signal for enabling the drive controlled rectifiers, after a time delay, to drive the motor at a predetermined positioning speed, position sensing means responsive to the angular position of the motor shaft and rendered effective, subsequent to said enabling of the drive controlled rectifiers, to emit a position signal, and means responsively to said position signal to disable the drive controlled rectifiers and to subsequently enable the brake controlled rectifier to brake said motor from said positioning speed to standstill with the sewing machine in the selected needle position.

3. A system as defined in claim 2 wherein the speed-responsive means is a phototachometer which generates a pulse train of frequency related to the motor speed and the timing means is a programmable unijunction transistor connected as a relaxation oscillator with a timing capacitor discharged periodically by said pulse train.

4. A system as defined in claim 2 wherein the brake-release control device, when triggered, applies voltage from a previously charged capacitor to oppose the braking current to reduce the current through the brake controlled rectifier below its holding current and thus turn it off.

5. A system as defined in claim 2 wherein the brake-release control device is a normally nonconducting transistor having its collector-emitter path connected directly across the motor armature and its base connected to receive said pulse signal.

6. A system as defined in claim 2 wherein said position signal is inhibited by a monostable multivibrator for its quasistable period to permit the driving torque to stabilize at the predetermined positioning speed before final braking can be initiated.

7. A system as defined in claim 2 wherein said speed-responsive and timing means is enabled by a flip-flop which is triggered by the same pulse which triggers the brake controlled rectifier and is disabled by the resetting of said flip-flop by the pulse signal emitted by said speed-responsive and timing means.

8. A digital control system for providing the switching logic necessary to correlate the starting, running and positional stopping of a sewing machine with the sequential energization and deenergization of solenoids for actuating thread handling devices to perform a thread-trimming function responsively to input command signals, comprising:

A DC motor coupled in continuous driving engagement with the sewing machine;

drive controlled rectifiers for applying driving current to said motor;

a brake controlled rectifier for applying braking current to said motor;

a brake-release control device for turning off said brake controlled rectifier;

solenoids for actuating thread handling devices;

solid-state pulse-generating means for generating waveform signals related in time to the angular speed and to the angular positions of the motor; and solid-state gating and memory means operative responsively to selected input command signals and to said waveform signals to enable triggering of said controlled rectifiers and the brake-release control device and energization and deenergization of said solenoids in proper time sequence to effect said thread trimming function.

9. A system as defined in claim 8 wherein the single input command signal is enabled by a gate which is opened responsively to a proper needle-down position as signaled by a phototransistor receiving light reflected from a reflecting segment.

10. A system as defined in claim 8 wherein the energization times for the solenoids are controlled by the quasistable periods of monostable multivibrators.